Dec. 1, 1931.          L. J. CLAPP          1,834,588

VALVE MECHANISM

Filed Dec. 29, 1927

Inventor:
Lewis J. Clapp.
by
Louis A. Maxim.
Atty.

Patented Dec. 1, 1931

1,834,588

UNITED STATES PATENT OFFICE

LEWIS J. CLAPP, OF CLAREMONT, NEW HAMPSHIRE, ASSIGNOR TO SULLIVAN MACHINERY COMPANY, A CORPORATION OF MASSACHUSETTS

VALVE MECHANISM

Application filed December 29, 1927. Serial No. 243,429.

My invention relates to valve mechanisms. An object of my invention is to provide improved valve mechanism. Another object of my invention is to provide an improved and simplified valve mechanism for comparatively small air compressor cylinders. A further object of my invention is to provide an improved valve mechanism comprising a minimum number of parts and constituting a self-contained unit which may be employed interchangeably as an inlet or discharge valve. Other objects and advantages of my invention will subsequently appear.

In the accompanying drawings, in which for purposes of illustration I have shown one illustrative embodiment of the invention;—

Figure 1:
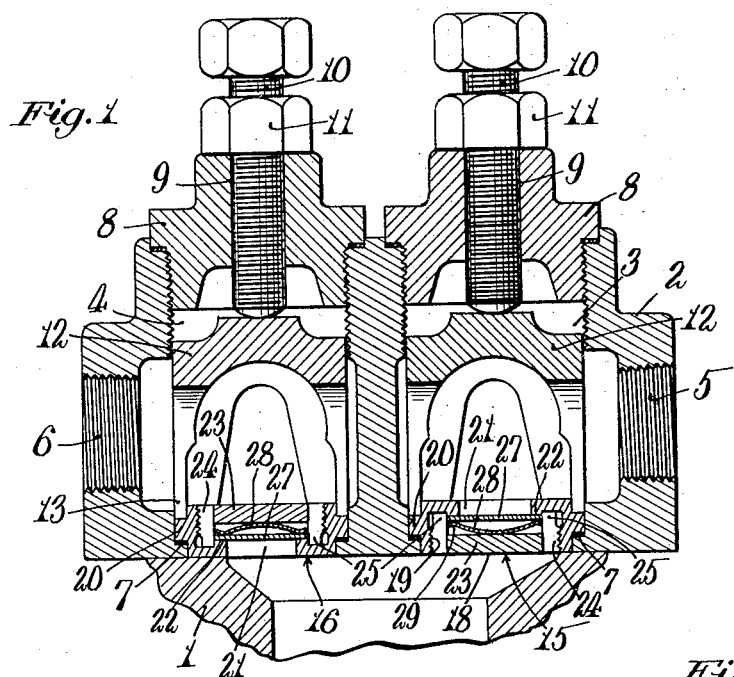
Fig. 1 is a central vertical section through the upper end of a compressor cylinder and the valve mechanism thereof.
Figure 2:
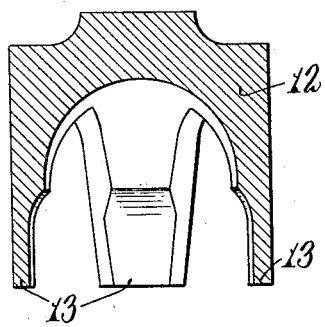
Fig. 2 is a central vertical section through a valve holding element.
Figure 7:
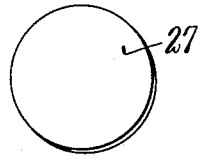
Fig. 7 is a perspective view of a valve element proper.
Figure 3:
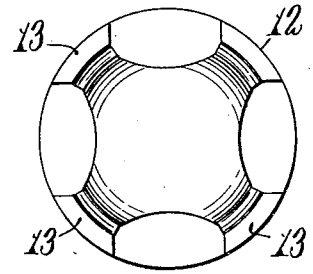
Fig. 3 is a bottom view of the element shown in Fig. 2.
Figure 4:
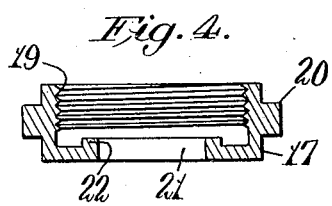
Fig. 4 is a central vertical section through the seat element of a valve cage unit.
Figure 8:
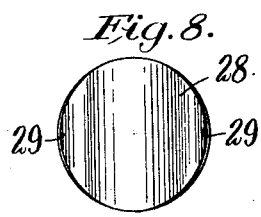
Fig. 8 is a plan view of a spring.
Figure 5:
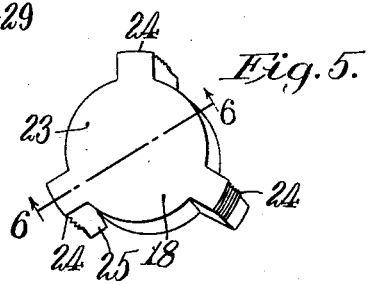
Fig. 5 is a perspective view of a combined guard and guide element.
Figure 6:
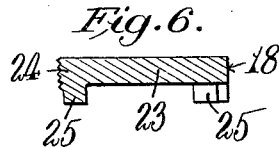
Fig. 6 is a section taken on the line 6—6 of Fig. 5 of the element shown in that figure.

Referring to the drawings and particularly to Fig. 1, the compressor cylinder casting 1 is provided with a valve housing member 2 at its upper end. The member 2 is provided with a pair of chambers numbered 3 and 4, arranged at opposite sides of a plane including the axis of the compressor cylinder. With the chamber 3 an inlet passage 5 communicates, and a discharge passage 6 communicates with the chamber 4. Each of the chambers is provided at its lower end with a shoulder 7 which precludes the dropping out of valve cage units in the event of the removal of the head from the cylinder and serves as a seat upon which a valve cage unit may seat directly or upon a gasket. The walls of the chambers 3 and 4 are threaded at their upper ends to permit the reception of closure elements 8. The closure elements are provided with threaded bores 9 and receive screws 10 provided with lock nuts 11. These screws serve to apply pressure to follower or holding elements 12. Each of the holding elements 12 comprises a member whose feet 13 are adapted to engage and hold in position a valve unit. The valve mechanism as a whole comprises two valve units: An inlet valve unit 15, and a discharge valve unit 16. Each of these valve units comprises two cage elements: A seat element 17 and a combined guard or cover and guide element 18. The seat element 17 is in the form of a hollow externally flanged cylindrical member having an internally threaded bore 19, a peripheral flange 20, a central passage 21, and surrounding the passage, an upwardly extending annular valve seat flange 22. Each of the guard and guide elements 18 comprises a substantially circular body or cover portion 23 having a plurality (herein three) of radially extending portions 24, each of which is peripherally threaded to permit cooperation with the threads of the threaded portion 19 of the seat member 17. Each of the portions 24 comprises a portion lying in the same planes with the body portion 23 and a portion lying outside those planes and providing a guiding surface 25 engageable with valve and spring elements and serving to position them. The valve member proper is a comparatively thin metallic disc, preferably formed of resilient material and designated 27. The spring 28 is formed from a thin metallic resilient disc and is transversely flexed and provided with reversely bent ends 29. Each valve unit is assembled by placing a valve member 27 upon the annular seat flange 22, superimposing a spring upon the valve element, and screwing the guard and guide element 18 into the internally threaded portion 19 of the cage element 17. The valve units are placed in mutually inverted positions in the chambers 3 and 4, the seat element 17 being the upper element in the inlet chamber and the lower element in the discharge chamber. The follower members 12 are then placed in position with the feet 13 engaging the radially extending flanges 20. The closure elements 8 are then screwed into place and the screw members 10 screwed down to bring the follower members into tight engagement with the flanges.

The mode of operation of the mechanism is obvious. Upon each suction stroke of the compressor piston (not shown), air entering through the inlet passage 5, and flowing between the legs of the follower member 12, passes downward through the opening 21 in the seat member 17 of the valve unit 15, unseating the valve, flexing the spring; and enters the cylinder, flowing out of the cage through the arcuate openings between the projections 24. Upon starting of the compression stroke, the inlet valve closes and the discharge valve, upon the building up of sufficient pressure, is forced from its seat; and the air passes out through the opening 21 in the valve unit 16, after opening and unseating the valve 27 of that unit, the air then flowing through the spaces surrounding the body portion 23 of the cover member between the projecting portions 24 of the latter, and then flowing from the chamber 4 to the discharge 6.

From the foregoing description it will be obvious that I have provided a very advantageous and simple valve construction, one equally adapted for use as an inlet or a discharge unit, one comprising a minimum possible number of parts, each readily produced, and very durable.

While I have in this application specifically described one form which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In combination, in a valve mechanism, an annular internally threaded member providing a chamber and an opening communicating with the chamber and surrounded by a valve seat, a cover member providing a cover portion and guiding portions projecting from the cover portion, said cover member having threaded engagement with the seat member, and a valve and a spring enclosed within the space between the seat and cover members and guided by the guiding portions, said seat member having a radially extending flange arranged for engagement by a follower member.

2. In combination, a cage member having an external peripheral flange, a radially extending web terminating in a raised valve seat surrounding a flow passage, and an interior chamber communicating with the flow passage and having its bounding wall threaded, a combined cover and guard member having a plurality of radially extending portions each peripherally threaded to cooperate with the first mentioned portion and each having guiding surfaces arranged to extend into juxtaposition to the seat, a circular valve cooperating with the seat, and a circular transversely flexed spring member arranged between the cover member and the valve.

3. In combination, in a valve unit, a boxlike seat member having an open end, a cover member for said open end threadedly secured to said seat member and having guiding portions extending within said seat member, and a valve and a spring enclosed within the space between the seat and cover members and guided in common by said guiding portions, said cover member affording a guard surface and flow passages for fluid passing upwardly within said seat member in contact with the walls thereof.

4. In combination, in a valve mechanism alternatively usable as an inlet or discharge controlling device, a cage member having oppositely facing surfaces adjacent the periphery thereof and adapted alternatively to engage a support according as the valve mechanism is to be used to control inlet or discharge, said cage member having an internal recess opening through one end thereof and at its other end having a passage communicating with the recess and surrounded by a valve seat within the recess, a valve and spring in the recess, and a cover having guiding lugs for guiding said valve and spring during opening and closing of the valve, said cover being positionable in said recess with its outer surface flush with an outer surface of the cage member.

5. In combination, in a valve mechanism alternatively usable as an inlet or discharge controlling device, a cage member having oppositely facing surfaces adjacent the periphery thereof and adapted alternatively to engage a support according as the valve mechanism is to be used to control inlet or discharge, said surfaces being substantially equally spaced from the ends of the cage which are respectively opposite thereto, said cage member having an internal recess opening through one end thereof and at its other end having a passage communicating with the recess and surrounded by a valve seat within the recess, a valve and spring in the recess, and a cover positionable in said recess with its outer surface flush with an outer surface of the cage member, whereby mechanical clearance may be maintained substantially uniform irrespective of the disposition of the valve mechanism.

In testimony whereof I affix my signature.

LEWIS J. CLAPP.